US010116928B2

(12) United States Patent
Li et al.

(10) Patent No.: US 10,116,928 B2
(45) Date of Patent: Oct. 30, 2018

(54) THREE-DIMENSIONAL (3D) DISPLAY SCREEN AND 3D DISPLAY DEVICE

(71) Applicants: Shanghai Tianma Micro-electronics Co., Ltd., Shanghai (CN); Tianma Micro-electronics Co., Ltd., Shenzhen (CN)

(72) Inventors: Jialing Li, Shanghai (CN); Lei Niu, Shanghai (CN); Zhihua Ling, Shanghai (CN)

(73) Assignees: Shanghai Tianma Micro-electronics Co., Ltd., Shanghai (CN); Tainma Micro-electronics Co., Ltd., Shenzhen (CN)

( * ) Notice: Subject to any disclaimer, the term of this patent is extended or adjusted under 35 U.S.C. 154(b) by 198 days.

(21) Appl. No.: 15/188,261

(22) Filed: Jun. 21, 2016

(65) Prior Publication Data
US 2017/0272736 A1    Sep. 21, 2017

(30) Foreign Application Priority Data
Mar. 15, 2016   (CN) .......................... 2016 1 0145885

(51) Int. Cl.
*H04N 13/324*    (2018.01)
*H04N 13/305*    (2018.01)
*H04N 13/31*     (2018.01)

(52) U.S. Cl.
CPC ......... *H04N 13/324* (2018.05); *H04N 13/305* (2018.05); *H04N 13/31* (2018.05); *H04N 2213/001* (2013.01)

(58) Field of Classification Search
CPC ........ G09G 3/36; G09G 3/364; G09G 3/3644; G09G 3/3648; G09G 3/3666;
(Continued)

(56) References Cited

U.S. PATENT DOCUMENTS 9,664,913 B2 * 5/2017 Niu .................... G02B 27/2214
9,699,443 B2 * 7/2017 Niu .................... G02B 27/2214
(Continued)

FOREIGN PATENT DOCUMENTS

CN    103278954 A    9/2013

*Primary Examiner* — Alexander Eisen
*Assistant Examiner* — Nelson Lam
(74) *Attorney, Agent, or Firm* — Anova Law Group, PLLC

(57) ABSTRACT

A 3D display screen and a 3D display device are provided. The 3D display screen comprises a pixel array comprising m laterally displaced groups. The laterally displaced group includes n rows of sub-pixel units, the sub-pixel units in a same sub-pixel unit row are arranged in a first lateral direction, m is a positive integer larger than or equal to 1, and n is a positive integer larger than or equal to 2. The sub-pixel unit includes a plurality of light-shielding stripes, and two adjacent light-shielding stripes have a gap of P in the first lateral direction. Along the first lateral direction, the $n^{th}$ sub-pixel unit row has a lateral displacement of P with respect to the $1^{st}$ sub-pixel unit row, the $i^{th}$ sub-pixel unit row has a lateral displacement of P/n with respect to the $(i-1)^{th}$ sub-pixel unit row, where i is a positive integer and $1 < i \leq n$.

18 Claims, 7 Drawing Sheets

(58) Field of Classification Search
CPC .. G09G 3/3677; G09G 3/3681; G09G 3/3688; G09G 3/3692; G09G 2300/0421; G09G 2300/0426
USPC ............ 345/87–104, 419–422, 664; 349/15; 359/462–466
See application file for complete search history.

(56) References Cited

U.S. PATENT DOCUMENTS

| | | | |
|---|---|---|---|
| 2008/0079662 A1* | 4/2008 | Saishu ............... | G02B 27/2214 345/55 |
| 2009/0002262 A1* | 1/2009 | Fukushima ........ | G02B 27/2214 345/1.1 |
| 2011/0038043 A1* | 2/2011 | Lin .................... | G02B 27/2214 359/463 |
| 2012/0139911 A1* | 6/2012 | Saishu ............... | H04N 13/0404 345/419 |
| 2012/0229457 A1* | 9/2012 | Hamagishi ......... | G02B 27/2214 345/419 |
| 2013/0128354 A1* | 5/2013 | Whangbo .......... | G02B 27/2214 359/463 |
| 2014/0002897 A1* | 1/2014 | Krijn ................. | H04N 13/0404 359/463 |
| 2014/0063083 A1* | 3/2014 | Hamagishi .............. | G09G 5/10 345/694 |
| 2014/0085719 A1* | 3/2014 | Hamagishi ......... | G02B 27/2214 359/463 |
| 2014/0152926 A1* | 6/2014 | Takahashi .......... | G02B 27/2214 349/15 |
| 2015/0109268 A1* | 4/2015 | Huang ................... | G09G 3/36 345/206 |
| 2015/0181202 A1* | 6/2015 | Niu .................... | H04N 13/0404 348/54 |

\* cited by examiner

THREE-DIMENSIONAL (3D) DISPLAY SCREEN AND 3D DISPLAY DEVICE

CROSS-REFERENCES TO RELATED APPLICATIONS

This application claims priority of Chinese Patent Application No. 201610145885.3, filed on Mar. 15, 2016, the entire contents of which are hereby incorporated by reference.

FIELD OF THE INVENTION

The present disclosure generally relates to the field of display technology and, more particularly, relates to a three-dimensional (3D) display screen and a 3D display device thereof.

BACKGROUND

Three-dimensional (3D) display technology generates images with visually perceived stereoscopy, immediacy and depth perception on a display screen, enabling human eyes to recognize a 3D image of an object. Because 3D display technology provides viewers with more vivid images and immersive viewing experience, it has become one of the main directions where the display technology advances, as well as a hot research topic in the display field.

Traditional 3D display technology, i.e., stereoscopic 3D display technology, requires the viewer to use special eyewear. For example, to achieve 3D visual effects, the viewer has to wear polarized eyewear or eyewear with specialized color filters, through which the viewer's left eye and right eye respectively receive light corresponding to two images with a parallax. However, due to the poor light sensitivity and inconvenience of the special eyewear, applications of the stereoscopic 3D display screens are substantially limited, and the user experience is significantly degraded.

Emerging glasses-free 3D display technology, i.e., autostereoscopic 3D display technology, eliminates the need for such eyewear and, thus, has becomes the trend of the 3D display technology. Autostereoscopic 3D display technology involves a range of different technologies, for example, grating, lenticular array, and multi-directional backlight, etc. Through generating a grating based on periodically arranged light-shielding materials, or controlling the light emission direction from different pixels based on a lenticular lens array, or respectively directing the backlight to the viewer's left eye and right eye based on a backlight design, two images with a parallax are respectively sent to the viewer's left eye and right eye, and an autostereoscopic 3D visual effect is realized.

However, in the autostereoscopic 3D displays, an optical interference often occurs between a periodic structure (e.g., pixels, black matrix) of the display screen and a periodic structure of the grating/lenticular lens array, which may result Moire fringes and/or crosstalk and degrade the display performance. Minimizing the Moire fringe and the crosstalk, and improving the autostereoscopic 3D display performance are highly desired for the autostereoscopic 3D displays.

The disclosed 3D display screen and 3D display device thereof are directed to solve one or more problems set forth above and other problems.

BRIEF SUMMARY OF THE DISCLOSURE

One aspect of the present disclosure provides a 3D display screen. The 3D display screen comprises a pixel array comprising m laterally displaced groups. The laterally displaced group includes n rows of sub-pixel units arranged in an array and sequentially numbered as a $1^{st}$ sub-pixel unit row to a $n^{th}$ sub-pixel unit row, the sub-pixel units in a same sub-pixel unit row are arranged in a first lateral direction, m is a positive integer larger than or equal to 1, and n is a positive integer larger than or equal to 2. The sub-pixel unit includes a plurality of light-shielding stripes arranged in parallel, and two adjacent light-shielding stripes have a gap of P in the first lateral direction. In the laterally displaced group, along the first lateral direction, the $n^{th}$ sub-pixel unit row has a lateral displacement of P with respect to the $1^{st}$ sub-pixel unit row, the $i^{th}$ sub-pixel unit row has a lateral displacement of P/n with respect to the $(i-1)^{th}$ sub-pixel unit row, where i is a positive integer and $1<i\leq n$. The lateral displacement between any two sub-pixel unit rows in the pixel array is less than or equal to P.

Another aspect of the present disclosure provides a 3D display device comprising the 3D display screen thereof. The 3D display device comprises a 3D display screen, and the 3D display screen comprises a pixel array comprising m laterally displaced groups. The laterally displaced group includes n rows of sub-pixel units arranged in an array and sequentially numbered as a $1^{st}$ sub-pixel unit row to a $n^{th}$ sub-pixel unit row, the sub-pixel units in a same sub-pixel unit row are arranged in a first lateral direction, m is a positive integer larger than or equal to 1, and n is a positive integer larger than or equal to 2. The sub-pixel unit includes a plurality of light-shielding stripes arranged in parallel, and two adjacent light-shielding stripes have a gap of P in the first lateral direction. In the laterally displaced group, along the first lateral direction, the $n^{th}$ sub-pixel unit row has a lateral displacement of P with respect to the $1^{st}$ sub-pixel unit row, the $i^{th}$ sub-pixel unit row has a lateral displacement of P/n with respect to the $(i-1)^{th}$ sub-pixel unit row, where i is a positive integer and $1<i\leq n$. The lateral displacement between any two sub-pixel unit rows in the pixel array is less than or equal to P.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

In the current autostereoscopic 3D displays, pixels are arranged in a horizontal direction and in a vertical direction with equal intervals, respectively, and black matrix stripes with equal intervals are also disposed among the pixels. Further, for the autostereoscopic 3D displays based on the grating or lenticular lens array, the grating or lenticular lens array has a spatial periodical structure similar to the pixel arrangement in the display screen. Thus, when the autostereoscopic 3D display is turned on, an optical interference between the display screen and the grating/lenticular lens array often occurs, causing Moire fringes and/or crosstalk and degrading the 3D display performance.

Moire fringes may be eliminated by laterally or horizontally or translationally shifting the pixel rows or slanting the grating at a certain angle with respect to the pixel rows. However, in the autostereoscopic 3D display with laterally displaced pixel rows, stripe colored patterns caused by optical interference may be observed in a transition zone between a viewing zone of the left eye and a viewing zone of the right eye. Further, a large lateral displacement of the pixel rows may result a crosstalk between the viewing zone of the left eye and the viewing zone of the right eye, because the light originally directed to the left eye may be partially directed to the right eye. That is, a larger lateral displacement of the pixel rows, a higher possibility of crosstalk.

The present disclosure provides an improved 3D display screen, which may be able to display 3D images and/or 3D videos to viewers without wearing special eyewear, i.e., realizing autostereoscopic 3D visual effects and, meanwhile, reduce the 3D crosstalk and improve the 3D display performance. The 3D display screen may be any appropriate type of display screens, such as plasma display screen, field emission display screen, liquid crystal display (LCD) screen, organic light emitting diode (OLED) display screen, light emitting diode (LED) display screen, quantum dots (QDs) display screen, electrophoretic display screen, or other types of display screens.

Figure 1:
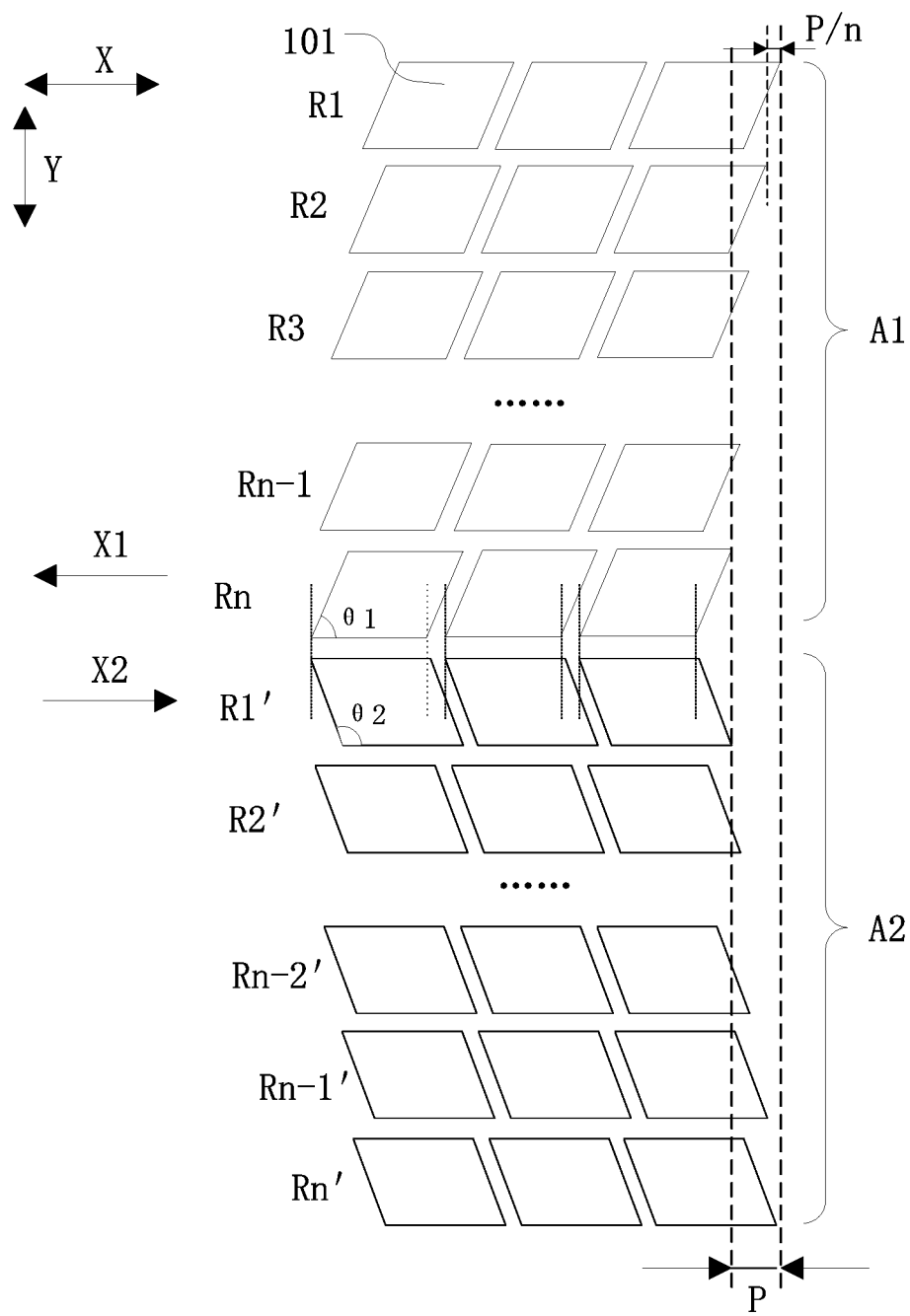
FIG. 1 illustrates a top view of an exemplary pixel array in an exemplary 3D display screen consistent with disclosed embodiments.

The disclosed 3D display screen may include a pixel array. FIG. 1 illustrates a top view of an exemplary pixel array in an exemplary 3D display screen consistent with disclosed embodiments. As shown in FIG. 1, the pixel array may include m number of laterally displaced groups: A1, A2, ..., Am, where m is a positive integer larger than or equal to 1. Each laterally displaced group A may include n rows of sub-pixel units 101 arranged in an array, where n is a positive integer larger than or equal to 2. Each row of sub-pixel units 101 (i.e., each sub-pixel unit row R) may include a plurality of sub-pixel units 101, and the sub-pixel units 101 in a same sub-pixel unit row R may be arranged along a first lateral direction X. The sub-pixel units 101 may be any appropriate sub-pixel units included in the 3D display screen for displaying an image or an image element.

In one embodiment, as shown in FIG. 1, the pixel array may include two laterally displaced groups, which may be numbered as A1 and A2 along a top-to-bottom direction of FIG. 1. The laterally displaced group A1 may include n sub-pixel unit rows R, which may be sequentially numbered as R1, R2 ... Rn-1, Rn along the top-to-bottom direction in FIG. 1. The laterally displaced group A2 may include n sub-pixel unit rows R, which may be sequentially numbered as R1', R2' ... Rn-1', Rn' along the top-to-bottom direction in FIG. 1. The laterally displaced group A1 may be called as a previous laterally displaced group of the laterally displaced group A2. It should be noted that, FIG. 1 only illustrates a partial structure of the pixel array, and the number of the sub-pixel units 101 shown in each sub-pixel unit row R is only for illustrative purposes, and is not intended to limit the scope of the present disclosure.

Figure 2:
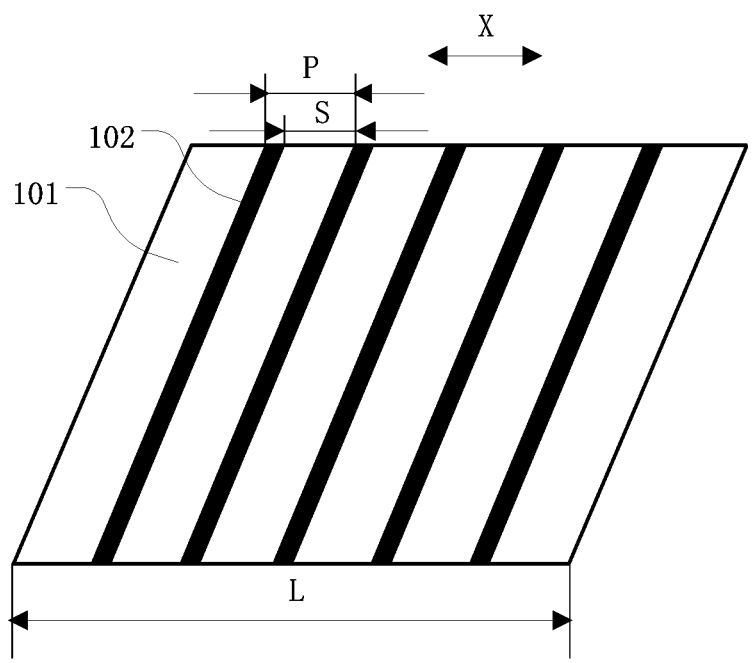
FIG. 2 illustrates a top view of an exemplary sub-pixel unit consistent with disclosed embodiments.

Further, the sub-pixel unit 101 may internally include a plurality of light-shielding stripes. FIG. 2 illustrates a top view of an exemplary sub-pixel unit consistent with disclosed embodiments. As shown in FIG. 2, the sub-pixel unit 101 may include a plurality of light-shielding stripes 102 repeatedly arranged with a certain gap. The light-shielding stripes 102 may be arranged in parallel, and two adjacent light-shielding stripes 102 may have a gap of P in the first lateral direction X.

The 3D display screen may include an array substrate and a color film substrate opposite to the array substrate. The light-shielding stripes 102 may be a metal layer disposed at the pixel electrode region of the array substrate, or may be a light-shielding layer disposed at the color barriers of the color film substrate. In each sub-pixel unit 101, the light-shielding stripes 102 may shield the light incident behind the light-shielding stripes 102 (e.g., light from a backlight source of the 3D display screen), forming a plurality of opaque regions, while the regions between two adjacent light-shielding stripes 102 may transmit the light incident behind the regions between two adjacent light-shielding stripes 102, forming a plurality of transmissive regions.

The plurality of opaque regions and the plurality of transmissive regions may be alternately and periodically formed in the sub-pixel unit 101 in the first lateral direction X, generating a grating. Thus, the left eye and right eye of the viewer may receive light from different sub-pixel units, and the autostereoscopic 3D display may be realized. It should be noted that, the light-shielding stripes 102 may be the opaque regions in the sub-pixel units, rather than a black matrix layer disposed among the color barriers corresponding to the sub-pixel units in the color film substrate.

Returning to FIG. 1, in each laterally displaced group, the $n^{th}$ sub-pixel unit row Rn may have a lateral displacement P along the first lateral direction X with respect to the $1^{st}$ sub-pixel unit row R1. The $i^{th}$ sub-pixel unit row Ri may have a lateral displacement P/n along the first lateral direction X with respect to the $(i-1)^{th}$ sub-pixel unit row Ri-1, where i is a positive integer and $1<i\leq n$. The $(i-1)^{th}$ sub-pixel unit row Ri-1 may be called as a previous sub-pixel unit row of the $i^{th}$ sub-pixel unit row Ri. That is, the lateral displacement between any two sub-pixel unit rows may be less than or equal to P. Referring to FIG. 1 and FIG. 2, the lateral displacement P (in the first lateral direction X) between the $n^{th}$ sub-pixel unit row Rn unit row and the $1^{st}$ sub-pixel unit row R1 may equal to the gap P (in the first lateral direction X) between two adjacent light-shielding stripes 102.

As discussed above, in the pixel array of the disclosed 3D display screen, each sub-pixel unit includes a plurality of light-shielding stripes, which may generate a periodic grating structure in the sub-pixel unit and realize the autostereoscopic 3D display visual effect. Further, the pixel array may include m number of laterally displaced groups. In each laterally displaced group, the lateral displacement P (along the first lateral direction X) between the $n^{th}$ sub-pixel unit row Rn and the $1^{st}$ sub-pixel unit row R1, may be equal to, the gap P (along the first lateral direction X) between two adjacent light-shielding stripes, such that the light received by the viewer's left eye and right eye may be uniformly distributed.

The $i^{th}$ sub-pixel unit row Ri may have the lateral displacement P/n along the first lateral direction X with respect to the $(i-1)^{th}$ sub-pixel unit row Ri−1, where i is a positive integer and $1<i\leq n$. That is, from the $2^{nd}$ sub-pixel unit row R2 to the $n^{th}$ sub-pixel unit row Rn, each sub-pixel unit row may be equally displaced by P/n with respect to the corresponding previous sub-pixel unit row. Thus, a uniform brightness distribution across each laterally displaced group may be realized.

Further, the lateral displacement (along the first lateral direction X) between any two sub-pixel unit rows may be less than or equal to the gap P (along the first lateral direction X) between two adjacent light-shielding stripes. Thus, in the entire pixel array, the lateral displacement of the pixel units may be substantially small, and the light received by the viewer's left eye and right eye may be uniformly distributed. A 3D crosstalk caused by a large lateral displacement of the pixel units may be suppressed, and the display performance of the 3D display screen may be improved accordingly.

Figure 7:
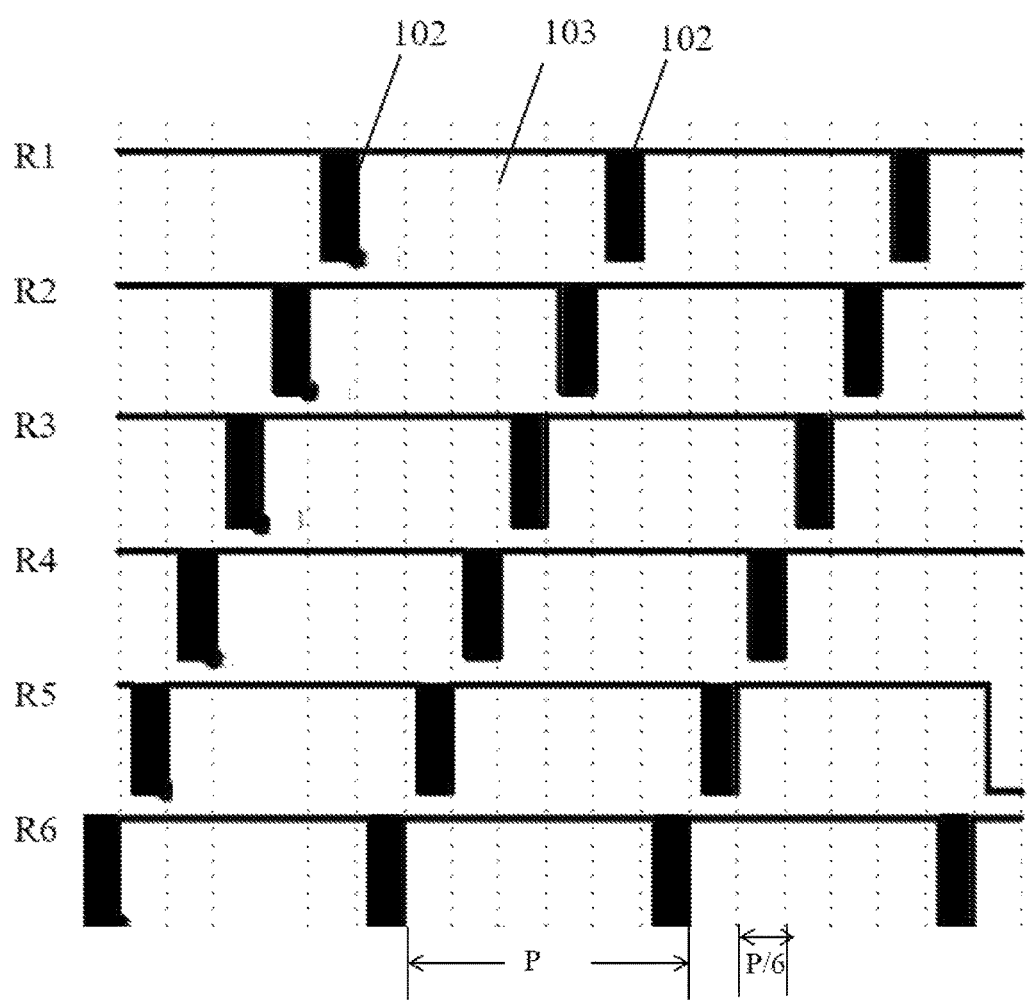
FIG. 7 illustrates an exemplary lateral displaced group consistent with disclosed embodiments.

FIG. 7 illustrates an exemplary lateral displaced group consistent with disclosed embodiments. As shown in FIG. 7, the lateral displaced group may include six sub-pixel unit rows R1-R6. The light-shielding stripes 102 may shield the light incident behind, forming the opaque regions (indicated by solid black regions in FIG. 7), while regions 103 between two adjacent light-shielding stripes 102 may transmit the light incident behind, forming the transmissive regions. Thus, periodic grating structures may be formed in the lateral displaced group. In particular, two adjacent light-shielding stripes 102 may have a gap of P, and each sub-pixel unit row may be laterally shifted by P/6.

Further, the sub-pixel unit 101 may have various shapes. In one embodiment, as shown in FIG. 1, each sub-pixel unit 101 may have a shape of parallelogram with two pairs of parallel sides, a first pair of parallel sides and a second pair of parallel sides. The first pair of parallel sides of each sub-pixel unit 101 may be parallel to the first lateral direction X. In a same laterally displaced group A, each sub-pixel unit 101 may be equally inclined with respect to the first direction X, i.e., the second pair of parallel sides of each sub-pixel unit 101 may form a same angle with respect to the first lateral direction X.

For example, in the laterally displaced group A1, each sub-pixel unit 101 may have the first pair of parallel sides (e.g., two bases) parallel to the first lateral direction X, and the second pair of parallel sides (e.g., two legs) form an angle θ1 (e.g., inclination angle or base angle θ1) with the first lateral direction X. It should be noted that, the shape, orientation and arrangement of the sub-pixel units 101 may be explained by using the concept of parallelogram for illustrative purposes.

In a same laterally displaced group A, each sub-pixel unit row may be laterally displaced in a same direction. For example, in the laterally displaced group A1, each sub-pixel unit row may be laterally displaced in a first direction X1, while in the laterally displaced group A2, each sub-pixel unit row may be laterally displaced in a second direction X2. In particular, both the first direction X1 and the second direction X2 may be parallel to the first lateral direction X.

Further, the sub-pixel units 101 in two adjacent laterally displaced groups A may be inclined in an opposite direction with respect to the first lateral direction X. That is, in two adjacent laterally displaced groups, the sub-pixel units 101 in one laterally displaced group and the sub-pixel units 101 in the adjacent laterally displaced group may be inclined in an opposite direction with respect to the first lateral direction X.

For example, as shown in FIG. 1, the laterally displaced group A1 may be adjacent to the laterally displaced group A2. Each sub-pixel unit 101 in the laterally displaced group A1 may have a base angle θ1 with respect to the first lateral direction X, and each sub-pixel unit 101 in the laterally displaced group A2 may have a base angle θ2 with respect to the first lateral direction X, where $θ1\leq 90°$ and $θ2\geq 90°$.

It should be noted that, in another embodiment, θ1 and θ2 may not be the base angel, as long as the relationship of the angels (i.e., θ1 and θ2) formed between the first pair of parallel sides of the sub-pixel units 101 and the first lateral direction X remains unchanged. That is, in the sub-pixel units 101 in two adjacent laterally displaced groups A may be inclined in an opposite direction with respect to the first lateral direction X.

In one embodiment, $θ1+θ2=180°$, i.e., the laterally displaced group A1 and the laterally displaced group A2 may be arranged symmetrically with respect to the first lateral direction X. Thus, the structure of the sub-pixel units in each laterally displaced group and the lateral displacement may trend to be close, realizing a better autostereoscopic 3D display performance.

In one embodiment, in two adjacent laterally displaced groups, the sub-pixel unit rows may be displaced in an opposite direction with respect to the corresponding previous sub-pixel unit row. That is, in two adjacent laterally displaced groups, the lateral displacement direction of the sub-pixel unit rows in one laterally displaced group may be opposite to the lateral displacement direction of the sub-pixel unit rows in the adjacent laterally displaced group.

For example, as shown in FIG. 1, in the laterally displaced group A1, the sub-pixel unit row may be laterally displaced in the first direction X1 with respect to the corresponding previous sub-pixel unit row, while in the laterally displaced group A2, the sub-pixel unit row may be laterally displaced in the second direction X2 with respect to the corresponding previous sub-pixel unit row. In particular, the first direction X1 may be parallel to but opposite to the second direction X2.

Further, one side in the first pair of parallel sides (e.g., an upper base) of the sub-pixel units in the $1^{st}$ sub-pixel unit row R1 in one laterally displaced group may be adjacent to one side in the first pair of parallel sides (e.g., a lower base) of the $n^{th}$ sub-pixel unit row Rn in the adjacent previous laterally displaced group. In a second lateral direction Y, the projection of the upper base of the sub-pixel units in the $1^{st}$ sub-pixel unit row R1 in one laterally displaced group may be overlapped with the projection of the lower base of the $n^{th}$ sub-pixel unit row Rn in the adjacent previous laterally displaced group. The second lateral direction Y may be perpendicular to the first lateral direction X.

For example, as illustrated in the FIG. 1, the laterally displaced group A2 may be adjacent to the previous laterally displaced group A1, in which the $1^{st}$ sub-pixel unit row R1' in the laterally displaced group A2 may be adjacent the $n^{th}$ sub-pixel unit row Rn in the adjacent previous laterally displaced group A1. Further, one base (e.g., an upper base) of the sub-pixel units in the $1^{st}$ sub-pixel unit row R1' in the laterally displaced group A2 may be adjacent to one base (e.g., a lower base) of the $n^{th}$ sub-pixel unit row Rn in the adjacent previous laterally displaced group A1. In the second lateral direction Y, the projection of the upper base of the sub-pixel units in the $1^{st}$ sub-pixel unit row R1' in the laterally displaced group A2 may be overlapped with the projection of the lower base of the $n^{th}$ sub-pixel unit row Rn in the adjacent previous laterally displaced group A1, as illustrated by the dotted lines in FIG. 1.

In the disclosed pixel array, the lateral displacement of the sub-pixel units may be configured to be substantially small and, meanwhile, a transition between two adjacent laterally displaced groups may be smooth. That is, the lateral displacement between two adjacent sub-pixel unit rows in two adjacent laterally displaced groups may not be large, such that an abrupt lateral change between two adjacent laterally displaced groups may be prevented.

The abrupt lateral change between two adjacent sub-pixel unit rows in two adjacent laterally displaced groups may lead to a nonuniform light distribution in an adjacent region between the two adjacent laterally displaced groups. For example, the light originally directed to the left eye of the viewer may be partially directed to the right eye of the viewer, and stripe colored patterns may appear in a transition zone between the viewing zones of the left eye and the right eye, i.e., the crosstalk may occur.

The disclosed pixel array may be able to reduce the abrupt lateral change between two adjacent laterally displaced groups. Thus, the crosstalk in the 3D display screen may be effectively suppressed, minimized or even eliminated, and the 3D display performance may be improved accordingly.

The number m of the laterally displaced groups included in the pixel array may be determined according to various factors, for example, fabrication process, application scenarios, and crosstalk requirements, etc. As discussed above, in a same laterally displaced group, each sub-pixel unit row may be equally displaced in the first lateral direction X with respect to the corresponding previous sub-pixel unit row. To maintain a substantially small lateral displacement of the sub-pixel units (i.e., maintain the lateral displacement between any two sub-pixel unit rows to be less than or equal to P) and, meanwhile, to further minimize the abrupt lateral change between two adjacent laterally displaced groups, in one embodiment, the number m of the laterally displaced groups included in the pixel array may be $1 \leq m \leq 10$.

The current 3D display screen includes hundreds or even thousands of laterally displaced groups. That is, when $1 < m < 10$, the number m of the laterally displaced groups included in the pixel array may be smaller than that included in the current 3D display screen. Thus, in the disclosed 3D display screen, the regions where the abrupt lateral change occurs (i.e., the adjacent regions between two adjacent laterally displaced groups regions) may be shrink, and a degradation of the display performance caused by any possible abrupt lateral changes may be effectively suppressed.

Figure 3:
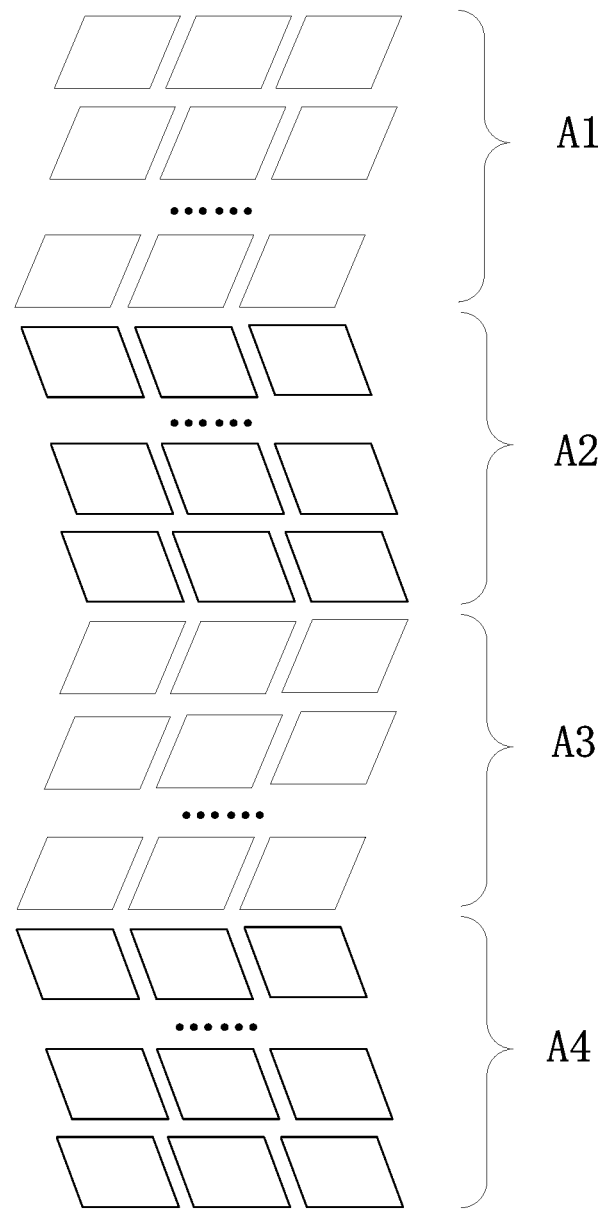
FIG. 3 illustrates a top view of another exemplary pixel array in an exemplary 3D display screen consistent with disclosed embodiments.

For example, in one embodiment, as shown in FIG. 1, the number m of the laterally displaced groups included in the pixel array is m=2, i.e., the pixel array may include two laterally displaced groups A1 and A2. In another embodiment, as shown in FIG. 3, the pixel array may include four laterally displaced groups, which are sequentially numbered as A1, A2, A3 and A4 along a top-to-bottom direction of FIG. 3. In certain embodiments, the number m of the laterally displaced groups included in the pixel array may be any positive integer smaller than or equal to 10.

In particular, when m=1, i.e., the pixel array only includes one laterally displaced group, each sub-pixel unit row may be equally displaced in the first lateral direction X with respect to the corresponding previous sub-pixel unit row, and the abrupt lateral change between two adjacent laterally displaced groups may be completely eliminated.

Returning to FIG. 1, as discussed above, each laterally displaced group A may include n number of sub-pixel unit rows R, i.e., each laterally displaced group A may include a same number of sub-pixel unit rows R, and n may be a constant number. However, in another embodiment, each laterally displaced group A may include a different number of sub-pixel unit rows R. For example, the laterally displaced group A1 may include 500 sub-pixel unit rows, while the laterally displaced group A2 may include 700 sub-pixel unit rows. In another embodiment, some laterally displaced groups A may include different numbers of sub-pixel unit rows R, while some laterally displaced groups A may include a same number of sub-pixel unit rows R.

Referring to FIG. 2, the light-shielding stripes 102 may have various shapes. In one embodiment, as shown in FIG. 2, the light-shielding stripes 102 may have a shape of parallelogram with two pairs of parallel sides: a third pair of parallel sides and a fourth pair of parallel sides. In particular, the third pair of parallel sides (e.g., two bases) of the light-shielding stripe 102 may be parallel to the first lateral direction X, and may be partially overlapped with the first pair of parallel sides (e.g., two bases) of the sub-pixel unit 101 parallel to the first lateral direction X. The fourth pair of parallel sides (e.g., two legs) of the light-shielding stripe 102 may be parallel to the second pair of parallel sides (e.g., two legs) of the sub-pixel unit 101.

Further, the plurality of light-shielding stripes 102 in each sub-pixel unit 101 may equally divide the sub-pixel unit 101 into a plurality of sub-pixel sections (i.e., transmissive regions) in the first lateral direction X. The sub-pixel unit 101 may have a length of L in the first lateral direction X, and each sub-pixel section may have a length of S in the first lateral direction X, such that a period grating structure may be formed in the sub-pixel unit 101.

The number of the sub-pixel sections and the number of the light-shielding stripes 102 in each sub-pixel unit 101 may be determined according to the numbers of viewers and the number of viewing directions, etc. In one embodiment, as shown in FIG. 2, the sub-pixel unit 101 may include five light-shielding stripes 102, and the five light-shielding stripes 102 may equally divide the sub-pixel unit 101 into 6 sub-pixel sections.

In addition, as discussed above, in each laterally displaced group, the $n^{th}$ sub-pixel unit row Rn may have a lateral displacement P along the first lateral direction X with respect to the $1^{st}$ sub-pixel unit row R1, and the lateral displacement between any two sub-pixel unit rows may be less than or equal to P. The gap P in the first lateral direction X between two adjacent light-shielding stripes 102 may be determined, according to the requirement of maintaining a small lateral displacement of the sub-pixel units in the entire pixel array and, meanwhile, reducing the crosstalk.

In one embodiment, in the first lateral direction X, the gap P between two adjacent light-shielding stripes 102, as well as, the lateral displacement P between any two sub-pixel unit rows in each laterally displaced group, may be configured to be substantially small, for example, $P \leq L/3$. That is, the lateral displacement $P/n$ between any two adjacent sub-pixel unit rows may be configured to be $P/n \leq L/3n$. Thus, a large lateral displacement of the sub-pixel units in the entire pixel array may be prevented, and a crosstalk caused by the large lateral displacement of the sub-pixel units may be reduced. In particular, the lateral displacement $P/n$ between any two adjacent sub-pixel unit rows may be configured to be $P/n \leq L/100n$, i.e., the lateral displacement P between any two sub-pixel unit rows in each laterally displaced group may be configured to be $P \leq L/100$.

Further, in one embodiment, the light-shielding stripes 102 may be a metal layer disposed on the array substrate. In particular, the array substrate may include a plurality of thin-film transistors (TFTs), a plurality of scanning lines extending from the gate electrodes of the TFTs, and a plurality of data lines extending from the source/drain electrodes of the TFTs.

For example, when the 3D display screen is a LCD display screen, the transmissive regions in each sub-pixel units 101 may be configured to be pixel electrodes defining by the scanning lines and the data lines. The light-shielding stripes 102 may be the metal layer disposed on the pixel electrodes, shielding the light incident behind the light-shielding stripes 102 (e.g., light from a backlight source of the 3D display screen) and forming the opaque regions. The transmissive regions and the opaque regions may be alternately and periodically arranged in the sub-pixel unit 101, generating the grating.

In another embodiment, the light-shielding stripes 102 may be disposed on the color film substrate, shielding the light incident behind the light-shielding stripes 102 (e.g., light from a backlight source) and generating the grating. The materials of the light-shielding stripes 102 may be, for example, resins capable of shielding light. For example, when the 3D display screen is an OLED display screen or other self-emitting display screens, the light-shielding stripes 102 may be disposed on the color film substrate, shielding the light incident behind the light-shielding stripes 102 (e.g., light from a backlight source of the 3D display screen) and generating the grating.

Figure 4:
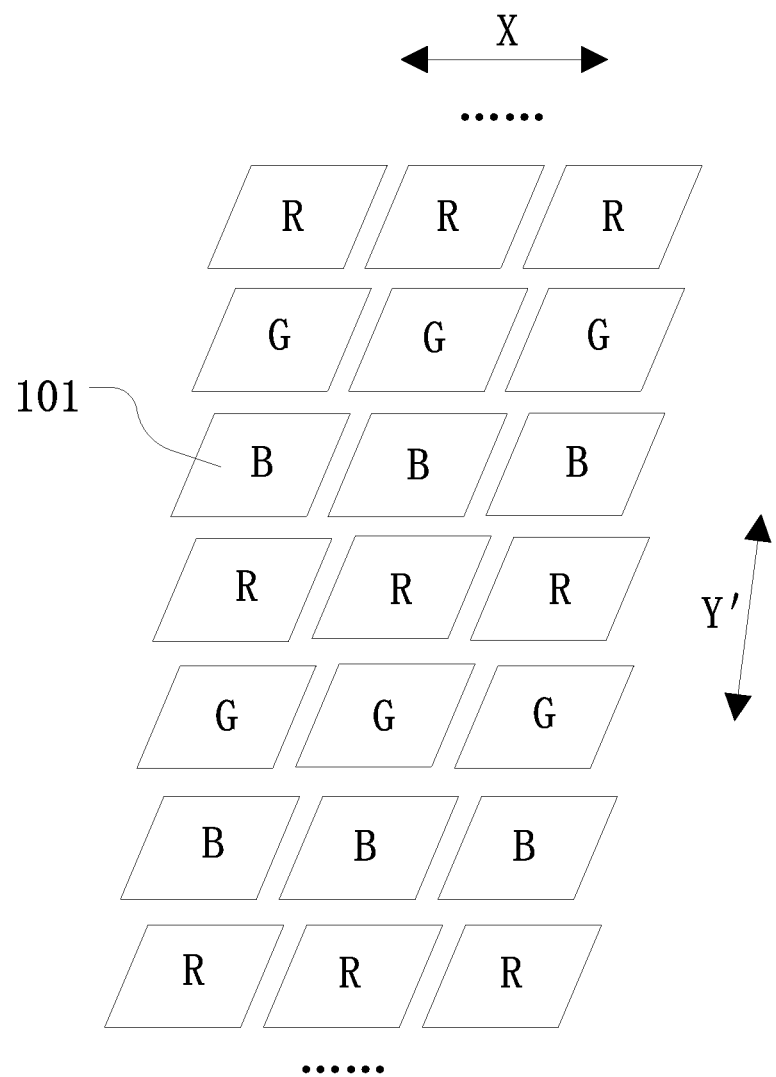
FIG. 4 illustrates an exemplary layout of sub-pixel units in an exemplary pixel array consistent with disclosed embodiments.

The disclosed pixel array may have various layout of the sub-pixel units. FIG. 4 illustrates a top view of an exemplary layout of sub-pixel units in an exemplary pixel array consistent with disclosed embodiments. As shown in FIG. 4, the pixel array may include a plurality of sub-pixel units 101 having a plurality of different colors (e.g., three different colors), which may be alternately and repeated arranged along a column direction (i.e., Y direction in FIG. 4) of the sub-pixel units. A row direction of the sub-pixel units may be the first lateral direction X.

It should be noted that, in a same laterally displaced group, each sub-pixel unit row may be equally displaced in the first lateral direction X with respect to the corresponding previous sub-pixel unit row. Thus, the column direction (i.e., Y' direction in FIG. 4) of the sub-pixel units may be no longer perpendicular to the first lateral direction X. Instead, the column direction (i.e., Y' direction in FIG. 4) of the sub-pixel units may be determined by the amount and the direction of lateral displacement of the sub-pixel unit row.

Further, in the row direction of the sub-pixel units, i.e., in the first lateral direction X, the color barriers corresponding to the sub-pixel units 101 in a same sub-pixel unit row may have different colors or a same color. That is, the color sub-pixel units in a same sub-pixel unit row may have different colors or a same color. The color sub-pixel units in a same sub-pixel unit row may also have various arrangements.

In one embodiment, as shown in FIG. 4, the pixel array may include a plurality of red sub-pixel units (R), a plurality of green sub-pixel units (G), and a plurality of blue sub-pixel units (B), which may be alternately and repeated arranged along the column direction (i.e., Y' direction in FIG. 4) of the sub-pixel units. The row direction of the sub-pixel units may be the first lateral direction X. Along the row direction of the sub-pixel units, i.e., the first lateral direction X, the color barriers corresponding to the sub-pixel units 101 in a same sub-pixel unit row may have same colors. Thus, an image distortion, caused by a color mixing of the light directed to the left eye and the right eye of the viewer, may be suppressed, and the 3D display performance may be enhanced.

Figure 5:
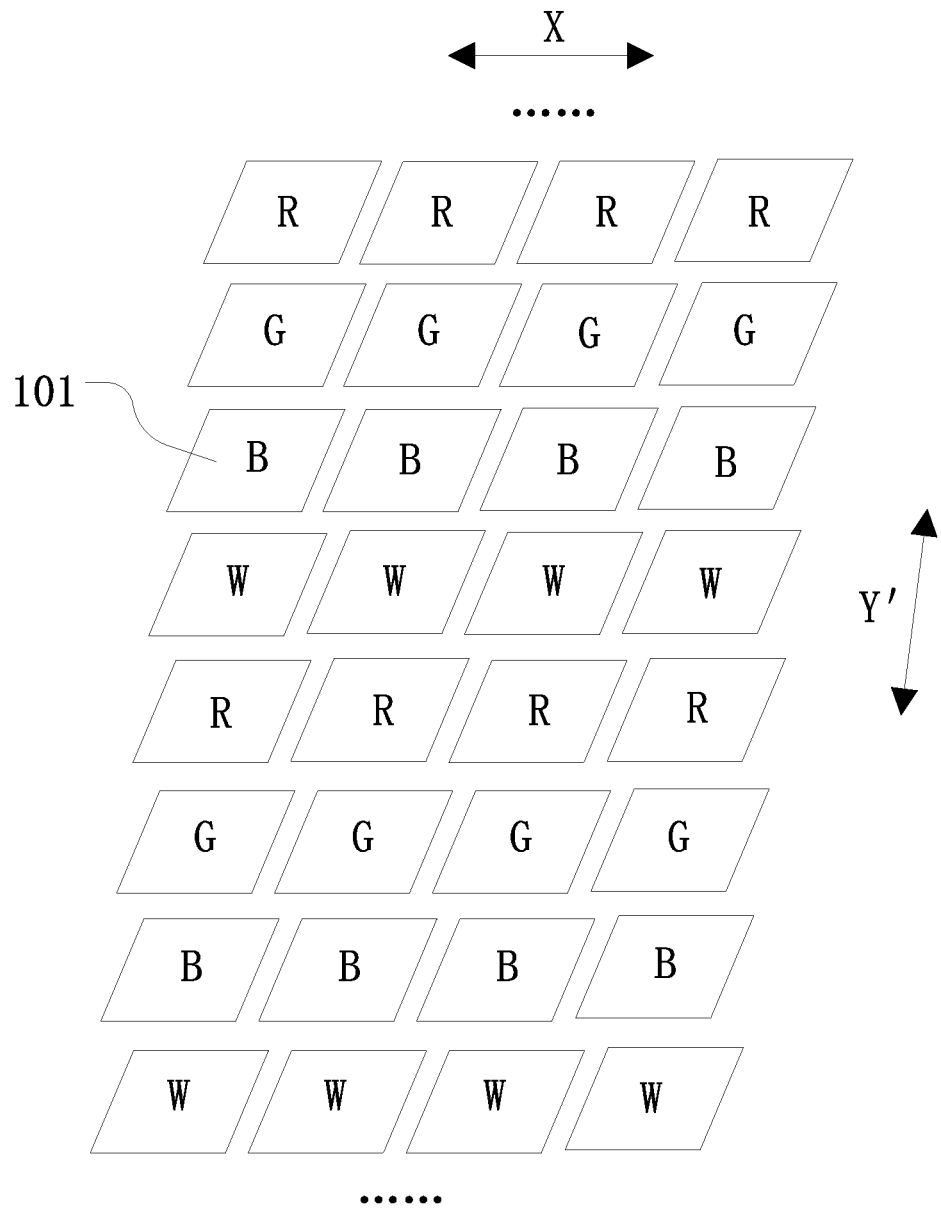
FIG. 5 illustrates another exemplary layout of sub-pixel units in an exemplary pixel array consistent with disclosed embodiments.

FIG. 5 illustrates a top view of another exemplary layout of sub-pixel units in an exemplary pixel array consistent with disclosed embodiments. The similarities between FIG. 4 and FIG. 5 are not be repeated here, while certain differences are illustrated. As shown in FIG. 5, the pixel array may include a plurality of sub-pixel units 101 having a plurality of different colors (e.g., four different colors), which may be alternately and repeated arranged along a column direction (i.e., Y' direction in FIG. 5) of the sub-pixel units. A row direction of the sub-pixel units may be the first lateral direction X.

In one embodiment, as shown in FIG. 5, the pixel array may include a plurality of red sub-pixel units (R), a plurality of green sub-pixel units (G), a plurality of blue sub-pixel units (B), and a plurality of white sub-pixel units (W), which may be alternately and repeated arranged along the column direction (i.e., Y' direction in FIG. 5) of the sub-pixel units. The row direction of the sub-pixel units may be the first lateral direction X. In another embodiment, the pixel array may include a plurality of red sub-pixel units (R), a plurality of green sub-pixel units (G), a plurality of blue sub-pixel units (B), and a plurality of yellow sub-pixel units (Y).

It should be noted that, in a same laterally displaced group, each sub-pixel unit row may be equally displaced in the first lateral direction X with respect to the corresponding previous sub-pixel unit row. Thus, the column direction (i.e., Y' direction in FIG. 5) of the sub-pixel units may be no longer perpendicular to the first lateral direction X. Instead, the column direction (i.e., Y' direction in FIG. 5) of the sub-pixel units may be determined by the amount and the direction of lateral displacement of the sub-pixel unit row.

Further, in the row direction of the sub-pixel units, i.e., in the first lateral direction X, the color barriers corresponding to the sub-pixel units 101 in a same sub-pixel unit row may have different colors or a same color. That is, the color sub-pixel units in a same sub-pixel unit row may have different colors or a same color. The color sub-pixel units in a same sub-pixel unit row may also have various arrangements.

For example, as shown in FIG. 5, along the row direction of the sub-pixel units, i.e., the first lateral direction X, the color barriers corresponding to the sub-pixel units 101 in a same sub-pixel unit row may have a same color. Thus, an image distortion, caused by a color mixing of the light directed to the left eye and the right eye of the viewer, may be suppressed, and the 3D display performance may be enhanced.

It should be noted that, FIG. 4 and FIG. 5 only illustrate a portion of the pixel array in the 3D display screen, the number of the sub-pixel units included in the pixel array and the number of the sub-pixel units included in each sub-pixel unit row are only for illustrative purposes, and are not intended to limit the scope of the present disclosure.

Figure 6:
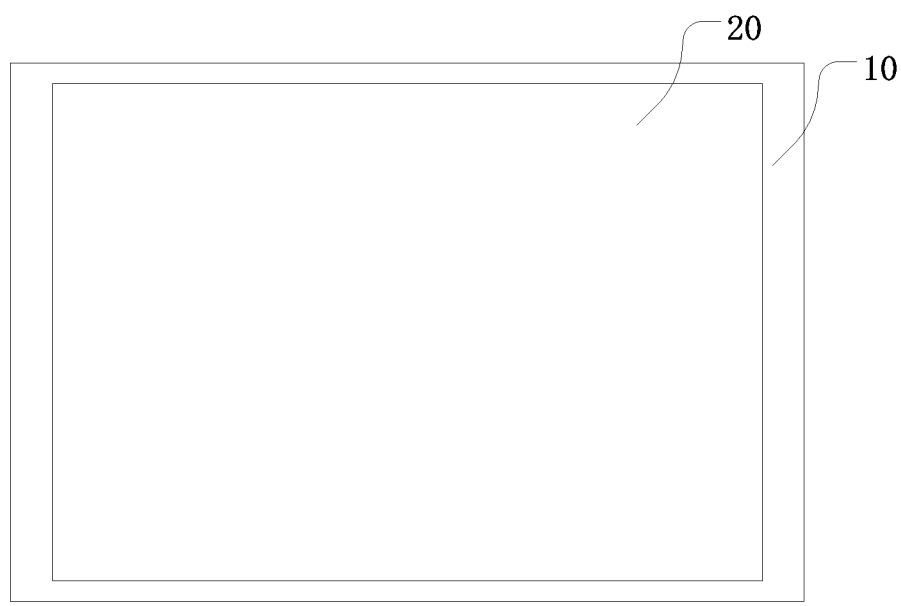
FIG. 6 illustrates a schematic diagram of an exemplary 3D display device consistent with disclosed embodiments.

The present disclosure further provides a 3D display device including any one of the disclosed 3D display screens. FIG. 6 illustrates a schematic diagram of an exemplary 3D display device consistent with disclosed embodiments. As shown in FIG. 6, the 3D display device 10 may include a 3D display screen 20, which may be any one of the disclosed 3D display screens. The 3D display device 10 may be smartphone, a tablet, a TV, a monitor, a notebook, a digital picture frame, a GPS, etc. Further, the 3D display device 10 may be any product or any component which is capable of displaying 3D images and/or 3D videos.

The 3D display device 10 may be any appropriate type of display devices, such as plasma display device, field emission display device, liquid crystal display (LCD) device, organic light emitting diode (OLED) display device, light emitting diode (LED) display device, quantum dots (QDs) display device, electrophoretic display device, or other types of display devices. Because the 3D display device 10 comprises any one of the disclosed 3D display screen 20, the 3D display device 10 may also have the same advantages as the disclosed 3D display screen 20, which are not repeated here.

In the disclosed 3D display screen and 3D display device, each sub-pixel unit in the pixel array of the 3D display screen may include a plurality of light-shielding stripes. The light-shielding stripes may be disposed on the array substrate or the color film substrate of the 3D display screen, shielding the light incident behind the light-shielding stripes 102 (e.g., light from a back light source of the 3D display screen). The light-shielding stripes may also equally divide each sub-pixel unit into a plurality of sub-pixel sections in the first lateral direction X, forming a period grating structure and realizing a 3D display.

Further, the pixel array may include m number of laterally displaced groups, where m is a positive integer and $1 \leq m \leq 10$. Each laterally displaced group may include n rows of sub-pixel units arranged in the first lateral direction X. In a same laterally displaced group, on one hand, the lateral displacement P (along the first lateral direction X) between the $n^{th}$ sub-pixel unit row and the $1^{st}$ sub-pixel unit row, may be equal to, the gap P (along the first lateral direction X) between two adjacent light-shielding stripes. Thus, the light received by the viewer's left eye and right eye may be uniformly distributed.

On the other hand, in a same laterally displaced group, each sub-pixel unit row may be equally displaced in the first lateral direction X with respect to the corresponding previous sub-pixel unit row. The transitions between two adjacent laterally displaced groups may be smooth, and the abrupt lateral change between two adjacent laterally displaced groups may be suppressed. Thus, the crosstalk in the 3D display screen may be effectively suppressed, minimized or even removed, and the 3D display performance may be improved accordingly.

Meanwhile, along the first lateral direction X, the lateral displacement between any two sub-pixel unit rows may be less than or equal to the gap between two adjacent light-shielding stripes, and the gap between two adjacent light-shielding stripes may be smaller than or equal to one third of the length of the sub-pixel unit. Thus, in the entire pixel array, the lateral displacement of the sub-pixel units may be small. Accordingly, the 3D crosstalk caused by a large lateral displacement of the sub-pixel units may be further suppressed, and the image quality of the 3D display performance may be further improved.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A three-dimensional (3D) display screen, comprising:
a pixel array comprising m laterally displaced groups, wherein:
a laterally displaced group in the m laterally displaced groups includes n rows of sub-pixel units arranged in an array and sequentially numbered as a $1^{st}$ sub-pixel unit row to a $n^{th}$ sub-pixel unit row, the sub-pixel units in a same sub-pixel unit row are arranged in a first lateral direction, m is a positive integer larger than or equal to 1, and n is a positive integer larger than or equal to 2;
a sub-pixel unit in the n rows of sub-pixel units includes a plurality of light-shielding stripes arranged in parallel and has a length of L in the first lateral direction, the plurality of light-shielding stripes are disposed inside the sub-pixel unit, two adjacent light-shielding stripes have a gap of P in the first lateral direction, and P<L;
in the laterally displaced group, along the first lateral direction, the $n^{th}$ sub-pixel unit row has a lateral displacement of P with respect to the $1^{st}$ sub-pixel unit row, an $i^{th}$ sub-pixel unit row in the n rows of sub-pixel units has a lateral displacement of P/n with respect to an $(i-1)^{th}$ sub-pixel unit row in the n rows of sub-pixel units, where i is a positive integer and $1<i \leq n$; and
along the first lateral direction, the lateral displacement between any two sub-pixel unit rows in the pixel array is less than or equal to P.

2. The 3D display screen according to claim 1, wherein:
the sub-pixel unit has a shape of parallelogram with a first pair of parallel sides and a second pair of parallel sides; and
the first pair of parallel sides of the sub-pixel unit is parallel to the first lateral direction.

3. The 3D display screen according to claim 2, wherein:
the second pair of parallel sides of the sub-pixel unit form an inclination angle with the first lateral direction.

4. The 3D display screen according to claim 3, wherein:
in the same laterally displaced group, each sub-pixel unit is inclined in a same direction with respect to the first lateral direction, and a lateral displacement direction of the $i^{th}$ sub-pixel unit row is same as the lateral displacement direction of the $(i-1)^{th}$ sub-pixel unit row.

5. The 3D display screen according to claim 4, wherein:
in two adjacent laterally displaced groups, the sub-pixel units in one laterally displaced group and the sub-pixel units in an adjacent laterally displaced group are inclined in an opposite direction with respect to the first lateral direction; and
the lateral displacement direction of the sub-pixel unit rows in the laterally displaced group are opposite to the lateral displacement direction of the sub-pixel unit rows in the adjacent laterally displaced group.

6. The 3D display screen according to claim 2, wherein:
the first pair of parallel sides of the sub-pixel unit parallel to the first lateral direction includes a first parallel side and a second parallel side.

7. The 3D display screen according to claim 6, wherein:
in two adjacent laterally displaced groups, the $1^{st}$ sub-pixel unit row in one laterally displaced group is adjacent to the $n^{th}$ sub-pixel unit row in an adjacent laterally displaced group;
the first parallel side of each sub-pixel unit in the $1^{st}$ sub-pixel unit row in the laterally displaced group is adjacent to the second parallel side of each sub-pixel units in the $n^{th}$ sub-pixel unit row in the adjacent laterally displaced group;
in a second lateral direction, a projection of the first parallel side of each sub-pixel unit in the $1^{st}$ sub-pixel unit row in the laterally displaced group is overlapped with a projection of the second parallel side of each sub-pixel unit in the $n^{th}$ sub-pixel unit row in the adjacent laterally displaced group; and
the second lateral direction is perpendicular to the first lateral direction.

8. The 3D display screen according to claim 3, wherein:
in two adjacent laterally displaced groups, the inclination angle formed by the second pair of parallel sides of the sub-pixel units in one laterally displaced group and the inclination angle formed by the second pair of parallel sides of the sub-pixel units in the adjacent laterally displaced group are supplementary angles.

9. The 3D display screen according to claim 1, wherein: $1 \leq m \leq 10$.

10. The 3D display screen according to claim 1, wherein:
the light-shielding stripe has a shape of parallelogram having a third pair of parallel sides and a fourth pair of parallel sides;
the third pair of parallel sides of the light-shielding stripe is parallel to the first lateral direction and is overlapped with the first pair of parallel sides of the sub-pixel unit; and
the fourth pair of parallel sides of the light-shielding stripe is parallel to the second pair of parallel sides of the sub-pixel unit.

11. The 3D display screen according to claim 10, wherein:
the light-shielding stripes divide each sub-pixel unit equally along the first lateral direction.

12. The 3D display screen according to claim 1, wherein: $P \leq L/3$.

13. The 3D display screen according to claim 12, wherein: $P \leq L/100$.

14. The 3D display screen according to claim 1, wherein:
the pixel array includes a plurality of sub-pixel units having a plurality of different colors; and
the sub-pixel units having the different colors are alternately and repeated arranged along a column direction of the sub-pixel units.

15. The 3D display screen according to claim 14, wherein:
the pixel array includes a plurality of red sub-pixel units (R), a plurality of green sub-pixel units (G), and a plurality of blue sub-pixel units (B);
each sub-pixel unit in the n rows of sub-pixel units is a red sub-pixel unit (R), a green sub-pixel units (G), or a blue sub-pixel unit (B); and
the red sub-pixel units (R), the green sub-pixel units (G), and the blue sub-pixel units (B) are alternately and repeated arranged along the column direction of the sub-pixel units.

16. The 3D display screen according to claim 14, wherein:
the pixel array includes a plurality of red sub-pixel units (R), a plurality of green sub-pixel units (G), a plurality of blue sub-pixel units (B), and a plurality of white sub-pixel units (W);
each sub-pixel unit in the n rows of sub-pixel units is a red sub-pixel unit (R), a green sub-pixel units (G), a blue sub-pixel unit (B), or a white sub-pixel unit (W); and
the red sub-pixel units (R), the green sub-pixel units (G), the blue sub-pixel units (B) and the white sub-pixel units (W) are alternately and repeated arranged along the column direction of the sub-pixel units.

17. The 3D display screen according to claim 14, wherein:
the pixel array includes a plurality of red sub-pixel units (R), a plurality of green sub-pixel units (G), a plurality of blue sub-pixel units (B), and a plurality of yellow sub-pixel units (Y);
each sub-pixel unit in the n rows of sub-pixel units is a red sub-pixel unit (R), a green sub-pixel units (G), a blue sub-pixel unit (B), or a yellow sub-pixel unit (Y), and
the red sub-pixel units (R), the green sub-pixel units (G), the blue sub-pixel units (B) and the yellow sub-pixel units (Y) are alternately and repeated arranged along the column direction of the sub-pixel units.

18. A three-dimensional (3D) display device, comprising:
a 3D display screen comprising a pixel array,
wherein the pixel array comprises a pixel array comprising m laterally displaced groups,
wherein:
a laterally displaced group in the m laterally displaced groups includes n rows of sub-pixel units arranged in an array and sequentially numbered as a $1^{st}$ sub-pixel unit row to a $n^{th}$ sub-pixel unit row, the sub-pixel units in a same sub-pixel unit row are arranged in a first lateral direction, m is a positive integer larger than or equal to 1, and n is a positive integer larger than or equal to 2;
a sub-pixel unit in the n rows of sub-pixel units includes a plurality of light-shielding stripes arranged in parallel and has a length of L in the first lateral direction, the plurality of light-shielding stripes are disposed inside the sub-pixel unit, two adjacent light-shielding stripes have a gap of P in the first lateral direction, and P<L;
in the laterally displaced group, along the first lateral direction, the $n^{th}$ sub-pixel unit row has a lateral displacement of P with respect to the $1^{st}$ sub-pixel unit row, an $i^{th}$ sub-pixel unit row in the n rows of sub-pixel units has a lateral displacement of P/n with respect to an $(i-1)^{th}$ sub-pixel unit row in the n rows of sub-pixel units, where i is a positive integer and $1 < i \leq n$; and
along the first lateral direction, the lateral displacement between any two sub-pixel unit rows in the pixel array is less than or equal to P.

\* \* \* \* \*